Apr. 10, 1923.
J. H. FORD
1,451,499
LOCKING DEVICE FOR AUTOMOBILES
Filed May 6, 1921
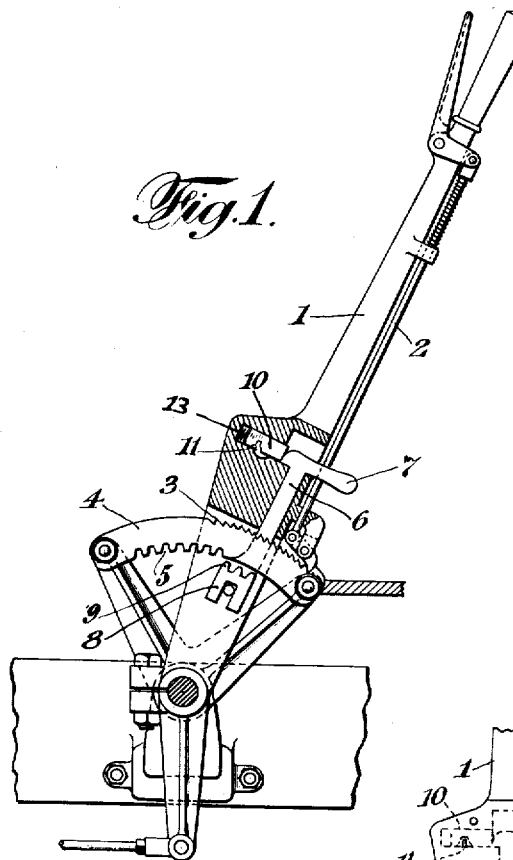
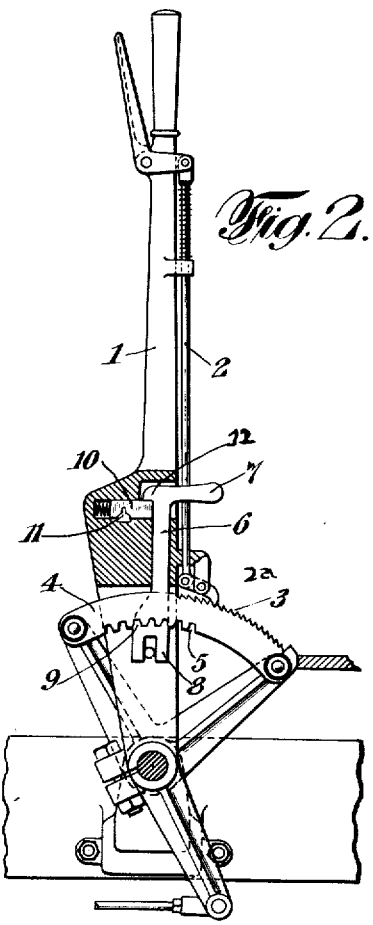
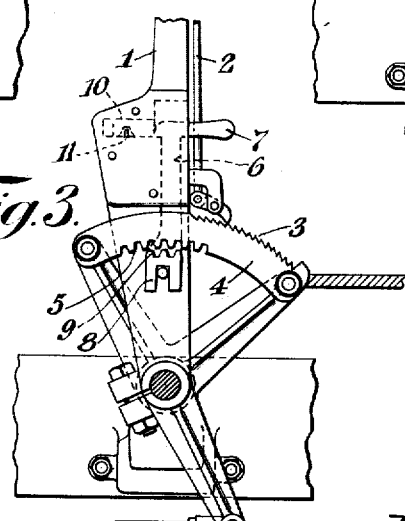
Inventor
James H. Ford
By his Attorneys
Kenyon & Kenyon Patented Apr. 10, 1923.

1,451,499

UNITED STATES PATENT OFFICE.

JAMES H. FORD, OF MOUNT VERNON, NEW YORK.

LOCKING DEVICE FOR AUTOMOBILES.

Application filed May 6, 1921. Serial No. 467,458.

*To all whom it may concern:*

Be it known that I, JAMES H. FORD, a citizen of the United States, residing at Mount Vernon, county of Westchester, State of New York, and whose post-office address is 315 South 4th Avenue, Mount Vernon, New York, have invented certain new and useful Improvements in Locking Devices for Automobiles, of which the following is a specification.

My invention relates to new and useful improvements in means for locking the lever controlling the brake of an automobile such for example as an emergency brake lever and has for its object to provide a simple effective means for locking the brake lever and in a convenient manner so that the operator can readily lock and unlock the same.

A preferred form of my invention is illustrated in the accompanying drawing in which Fig. 1 shows a side elevation of an emergency brake lever of an automobile, partly in section, when the brake is off. Fig. 2 shows the lever in braking position, my device locking the lever in such position. Fig. 3 shows my improved device in greater detail, the lever being in braking position, but not locked. In the drawing and in the following description like numerals refer to similar parts throughout.

1 is an ordinary emergency brake lever on a motor car with the usual ratchet catch means 2 and 3 on the segment 4. Rounded teeth 5 are cut in the rear and under-side of this segment. 6 is the shank of my locking device having part 7 to be used as a handle in operating the device. The lower part of the device is provided with a block 8 arranged with upwardly projecting teeth 9 adapted to engage into teeth 5 projecting downwardly from segment 4.

The device is operated in the following manner. When the brake lever is pulled from the position shown in Fig. 1 to that of Fig. 2 it is held in place by the usual ratchet catch consisting of rod 2, its pawl and ratchet teeth 3 on segment 4. If it now be desired to lock the brake in position the operator will raise the locking device by means of handle 7. This will cause teeth 9 on block 8 to enter and engage teeth 5 on the lower side of segment 4. Bolt 10 mounted on the frame work of lever 1, being forced forward by a small spring 13, will then automatically spring behind shoulder 12 on handle 7. The brake lever is thus located in position and can only be released by the withdrawal of bolt 10. This is accomplished by the use of a key inserted into keyhole 11.

My improved device can be conveniently operated and will automatically lock the emergency lever into position and at the same time it is so arranged that the operator can unlock the device by the simple insertion of a key in a lock, which is also conveniently located. The brake lever is positively locked in position and by reason of the arrangement of the parts the locking means cannot easily be tampered with while still easily accessible for ordinary operation.

As shown in the drawing, the operating parts of my locking device are located within the interior of the brake lever. This is the preferable form of my device as then these operating parts cannot be tampered with by a thief or bent out of line. If this part of the brake lever be reenforced the likelihood of such an occurrence is rendered negligible. In the device as shown the only part lying without the brake lever is the operating nob 7. When the lever is locked if the nob 7 be broken off, the device still remains in locked position and the car protected.

What I claim as new and desire to secure by Letters Patent is:

1. The combination with a brake lever, operating rod and pawl and toothed segment, of a separate locking device mounted on the brake lever having positive locking means at its lower end adapted to engage with non-serrated means on the lower side of the segment when the locking device is pulled upward, and a spring-actuated bolt adapted to lock said device in its uppermost position and adapted to be released by a key, whereby when the locking device is pulled upward the brake lever will be automatically locked in position.

2. The combination with a brake lever and its operating parts, of a separate locking device mounted on the brake lever provided at its lower end with upwardly projecting teeth, a rack on the under side of the brake segment, the teeth on the locking device adapted to engage teeth of the rack when the locking device is pulled upward, and an automatic bolt adapted to spring below a part of the locking device when the latter is pulled upward to hold the parts in locked position, the bolt being adapted to be released by a key.

3. The combination of a locking device attached to a brake lever of a motor car but operable separately therefrom, having means at its lower portion to engage positively with non-serrated means located on the under side of the brake segment when the locking device is operated, and a spring-actuated bolt adapted automatically to lock the locking device in locking position and adapted to be released by a key.

4. The combination with an operating lever of a motor car of a separate locking device mounted on the lever having locking means at its lower end adapted to engage with non-serrated means on the lower portion of the segment when the locking device is operated, and a spring actuated bolt adapted automatically to lock the locking device in locking position and adapted to be released by a key.

5. The combination of a locking device attached to a brake lever for a motor car, but operable separately therefrom having upwardly projecting teeth at its lower portion to engage with non-serrated recesses located on the under side of the brake segment when the locking device is operated, a handle to operate the said device, and a spring actuated bolt adapted automatically to lock the locking device in locking position and adapted to be released by a key.

6. The combination of a locking device attached to a brake lever but operable separately therefrom, the operating parts of said locking device being located within the interior of said lever, said locking device having means at its lower portion adapted to engage with non-serrated recesses located on the under side of the brake segment when the locking device is operated, a handle to operate the said device projecting outside the said lever, and a bolt adapted to hold said locking device in locked position. said bolt being operated by a key.

In testimony whereof I have signed my name to this specification.

JAMES H. FORD.

Certificate of Correction.

It is hereby certified that in Letters Patent No. 1,451,499, granted April 10, 1923, upon the application of James H. Ford, of Mount Vernon, New York, for an improvement in "Locking Devices for Automobiles," an error appears in the printed specification requiring correction as follows: Page 2, lines 24 and 25, claim 5, for the word "portion" read *end adapted;* and that the said Letters Patent should be read with this correction therein that the same may conform to the record of the case in the Patent Office.

Signed and sealed this 29th day of May, A. D., 1923.

[SEAL.]
KARL FENNING,
*Acting Commissioner of Patents.*